June 24, 1941.  A. R. MESSENGER  2,246,888
RIVET
Filed March 31, 1941
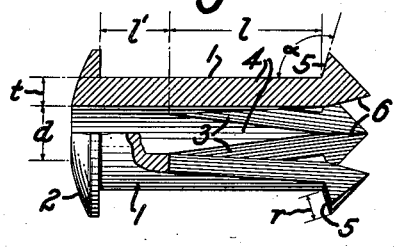
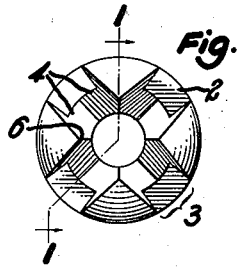
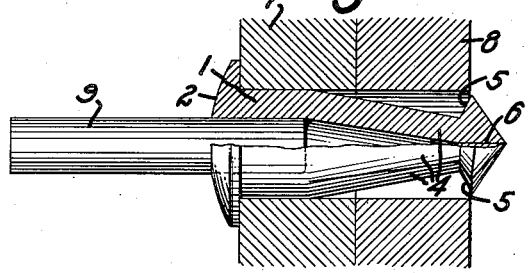
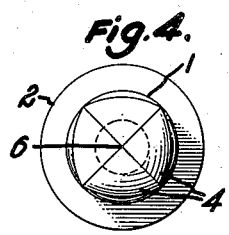
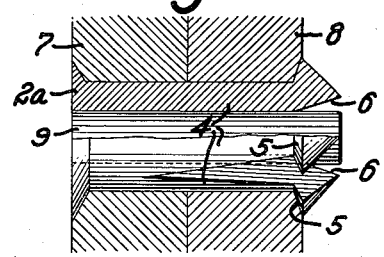
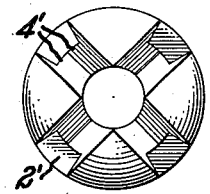
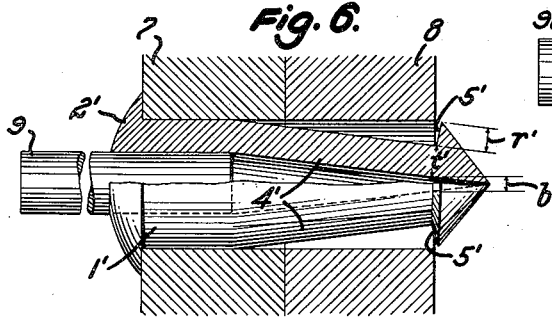
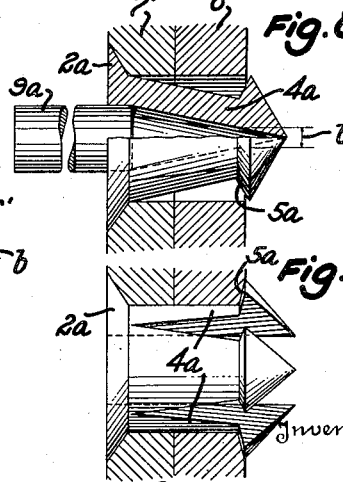
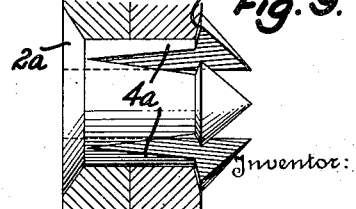
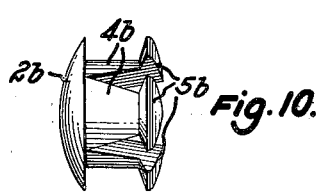
Inventor:
Archibald Randal Messenger,
By
Pierce + Scheffler,
Attorneys.

Patented June 24, 1941

2,246,888

UNITED STATES PATENT OFFICE 2,246,888

RIVET

Archibald Randal Messenger, Mattapoisett, Mass.

Application March 31, 1941, Serial No. 386,143

12 Claims. (Cl. 85—40)

This invention relates to rivets and particularly to rivets that may be inserted and clinched from a single side of the punched or drilled plates that are to be united.

Rivets of this type are useful in the construction and repair of hollow bodies such as tanks, ship hulls and the like. An important field of use for a "buck-less" rivet is in the aeroplane industry as it is difficult or impossible to insert or to hold tools within wing tips to buck the small aluminum or duraluminum rivets.

Prior proposals for buck-less or self-heading rivets have not been entirely satisfactory and the prior rivets have been open, in general, to the objections that the plates were not compressed upon each other, and the rivet shapes were such that any movement of the plates as a result of the original relatively loose assembly would increase the play by a cutting of the plates or rivets, or both.

This application is a continuation-in-part of, and replaces, my copending application Ser. No. 353,563, filed August 21, 1940.

An object of the present invention is to provide buck-less or self-heading rivets that have substantially the same clamping action on the joined plates as the customary hammered or axially compressed rivets. An object is to provide a tubular rivet in which the inner end has a flange that extends at somewhat more than 90° to the adjacent shank of the rivet, the inner end being longitudinally split into a plurality of sections by deep V-shaped notches to permit bending of the inner end sections to locate the flanges thereof within the diameter of the rivet shank, and a pin that may be driven through the bore of the rivet to force the flanged sections outwardly to engage the inner plate face and compress the plates upon each other. More specifically, an object is to provide a self-heading rivet including a headed tube having, as originally manufactured, a plurality of deep V-shaped notches at its inner end, the tube end sections between the notches having flanges that extend outwardly at more than 90° to the end sections, and the end sections being bent inwardly to close the original notches and bring the flanges within the original tube diameter, thus permitting insertion of the tube within the punched holes of plates for a subsequent expansion of the tube to its original form by driving a pin into the bore of the tube. A further object is to provide self-heading rivets, such as previously stated, in which the effective length of the rivet, as measured along the shank from the outer head to the base of the flanges that are to form the inner head, is slightly less than the thickness of the plates to be joined, whereby the inclination of the flanges draws the plates together when the flanged end sections are forced outwardly by the pin.

These and other objects and advantages of the invention will be apparent from the following specification when taken with the accompanying drawing in which:

Fig. 1 is a side elevation, with parts in section as seen on the plane indicated by line I—I of Fig. 2, of the tubular element of a rivet embodying the invention, the rivet being shown in expanded or originally manufactured condition;

Fig. 2 is an inner end view of the same;

Fig. 3 is a sectional view through plates and a rivet in position ready for clinching, the lower part of the rivet being shown in elevation;

Fig. 4 is an inner end view of the rivet in collapsed position;

Fig. 5 is a sectional view, similar to Fig. 3, but showing a flat head rivet in clinched condition;

Fig. 6 is a fragmentary sectional view of assembled plates and a rivet constituting another embodiment of the invention, the rivet being shown in collapsed condition ready for expansion;

Fig. 7 is an elevation of the inner end of an expanded rivet of the Fig. 6 type;

Fig. 8 is a fragmentary sectional view, similar to Fig. 6, of a short rivet extending through assembled plates in position for clinching;

Fig. 9 is a fragmentary sectional view through the assembly of Fig. 8 as seen after the setting of the rivet; and Fig. 10 is a side elevation of a rivet, as initially formed or as expanded, of minimum shank length.

The rivets contemplated by this invention are essentially headed hollow bodies, with pins for expanding the same, that are preferably initially formed in expanded condition and then collapsed for insertion in the punched or drilled holes of the plates that are to be connected. The rivets will usually be formed of metal, and preferably of the same metal as the plates or members that are to be joined. The expanding pin member may be of the same or a harder metal, and may be removed from or left within the tubular member after it is expanded. The tubular members may be cast of a malleable metal but preferably are formed by die-pressing a tube of malleable metal.

In Figs. 1 and 2, the tubular member of the rivet is shown as initially manufactured by a casting or stamping process and, except for second order effects, the tubular member has the same shape when in final position in clamping engagement with a plurality of plates. The outer end of the tubular body 1 has a flange or head 2 that may be of any desired form. The inner shank end of the tubular body is divided by a plurality of deep V-shaped notches 3 into a plurality of end sections 4 that have a radial thickness equal to that of the base of the tubular body. The shank portions of the end sections terminate in outwardly flaring flanges 5 that meet the shank sections at an angle α that is not less than 93° and not more than 115°. The inner central edges 6 of the several end sections are outwardly flared, at an angle determined by the depth of the slots 3 and the diameter of the tubular body, to permit a collapse of the outer end sections to position the flanges 5 within the circumferential surface of the tubular body.

This collapse of the outer end sections, as illustrated in Fig. 3, permits the insertion of the hollow body within the punched or drilled holes in the plates 7, 8 that are to be united. A pin 9 may be secured in each tubular member by a close driving fit, or by shellac or the like, when the final rivet structure is to approximate a conventional solid rivet. When high shear resistance is not essential, the pin 9 may be a tool for expanding the rivet, the tool being removed after the rivet is set.

Reverting to Fig. 1, the preferred radial thickness $t$ of the wall of the rivet shank is $$\frac{d}{2}$$

where $d$ is the diameter of the bore of the tubular member. The radial length $r$ of the flanges 5 is approximately one-half the bore diameter, as this ratio permits a collapse of the flanges within the rivet diameter $(d+2t)$ when, as preferred for strength, the wall thickness $t$ is equal to one-half the bore diameter. The length $l$ of the slotted section of the rivet shank is not critical in the case of relatively long rivets as the angle of the notches 3 may have any desired value up to 45°. The length $l'$ of the tubular section between the head 2 and the deformable end sections 4 may be zero or any desired value in accordance with the thickness of the plates to be joined and the selected angle of the grooves 3.

The method of operation of the invention is as follows. The collapsed tubular body is inserted from the outer face of the plate assembly 7, 8 and the pin 9 is driven in to force the collapsed end sections 4 back into their original position. The total shank length $(l+l')$, is such that the thickness of the plate assembly is somewhat more than the total shank length but less than the axial distance between the rivet head 2 and the outer edges of the flanges 5. The inclined flanges 5 meet the inner face of the plate 8 at a small angle which eliminates cutting of the flange 5 and crushing of the plate 8, and the outward movement of the end sections 4 therefore wedges the flanges 5 over the face of the plate 8 to establish a high compression of the plates 7, 8 upon each other. The outer face of the plate 8 is compressed but is not crushed in view of the small angle between the plane of the outer surface of plate 8 and the inclined surfaces of the flanges 5.

The angle α between the flanges 5 and the adjacent shank surfaces may be as low as about 93° when the plates 7, 8 are uniformly of the same thickness and are free from surface irregularities. This ideal condition is not satisfied in the commercial manufacture of plates, and the inclination of the flange 5 is increased to from about 100° to 110° in view of the variations in the effective total thickness of the parts that are to be joined. The inclination must not exceed that value at which the flanges 5 are cut by the sharp edge of the plate 8 when the end sections of the rivet are driven outwardly by the pin 9. I have found the upper limit for the inclination of the flanges 5 to be about 115°.

When the rivet of Fig. 3 is set by driving in the pin 9, the prongs 4 and flanges 5 occupy the positions with respect to the plates 7, 8 that are shown in Fig. 5 for a rivet with a flat head 2a. The high pressure between the plates 7, 8 precludes relative movement under forces of a lesser order than would destroy a conventional "bucked" rivet assembly. The flanges 5 are approximately perpendicular to the line of action of the stresses established by the compression of the plates upon each other, and therefore axial stresses along the rivet are not sufficient to loosen the riveted joint.

An alternative construction of the split inner end of the rivet, as shown in Figs. 6 to 10, inclusive, eliminates the outwardly flared edges 6 which must be provided when, as previously described, the radial thickness of the sections 4 and the radial length of the flanges 5 are each equal to one-half the diameter $d$ of the bore. The differences between the two embodiments can be best appreciated from a comparison of Figs. 3 and 6.

As shown in Fig. 6, the tubular body 1' has an outer head 2' of desired shape and an inner end portion comprising longitudinally extending sections 4' with outwardly flaring flanges 5'. The conical inner wall of the collapsed end sections 4' does not terminate in the radial plane of the inner edges of the flanges, as in Figs. 1-5 construction, but extends to the inner tip of the rivet. The diameter $b$ of the conical bore at the transverse plane of the flanges 5' therefore reduces the maximum radial thickness of the metal that can be collapsed to lie within the outer diameter of the tubular body portion 1'. The radial thickness $t'$ of the rivet shank and the radial length $r'$ of the flanges 5' may be varied in different manners but, in general, I prefer to make the wall thickness $t'$ equal to $$\frac{d}{2}$$

i. e. one-half the bore diameter $d$, and to make the flange length $r'$ equal to $$\left(\frac{d}{2}-\frac{b}{2}\right)$$

The initial, and the final form, of the rivet of Fig. 6 is shown in end elevation in Fig. 7. Relatively thin plates 7', 8' may be connected by rivets in which the grooves between the sections 4a extend substantially the entire length of the shank to terminate at or adjacent the head 2a of the rivet, see Figs. 8 and 9. The expanding pin 9a of the rivet may be left in place after the rivet is expanded or, as indicated by Fig. 9, may be driven completely through the rivet and removed.

The minimum length of a rivet for connecting thin plates, as shown in Fig. 10, is equal substantially to the bore $d$ of the rivet when the wall thickness is equal to one-half the bore diameter. The grooves that divide the shank into sections 4b extend to the rivet head 2b, and have an angular spread of 45°. The split end sections 4b may terminate in conical heads such as previously described and illustrated or, as shown, in relatively thick and domed heads 5b.

The conical inner head, as shown in Figs. 1 to 9, subtends an angle of about 90° when the rivet is expanded, but the inclination of the conical head may be varied in accordance with design requirements to develop the required strength with a minimum mass of metal. Furthermore, as indicated by Fig. 10, the conical surface is not an essential feature as a domed construction of appropriate geometry for the required strength may be used.

I have specified the proportions that I believe to be desirable for maximum strength but it is to be understood that the invention is not limited to any given proportions and that other ratios may be used without departing from the spirit of my invention as set forth in the following claims.

I claim:

1. A hollow rivet comprising a tubular body having a head at its outer end, the inner end of the tubular body being initially separated into a plurality of sections by deep V-shaped notches, and flanges extending outwardly from said end sections at an angle of more than 90°, said end sections being bent inwardly toward the axis of the tubular body to position said flanges within the original diameter of the tubular body, whereby a pin may be driven into said tubular body from the outer end to force said end sections outwardly to exert a clamping pressure upon material between said head and flanges that has a thickness intermediate the distances between the head of the tubular body and respectively the inner and the outer edges of said flanges.

2. A self-heading hollow metal rivet for clamping plates to each other, said rivet comprising a hollow body having a headed outer end, the inner end of the hollow body being longitudinally split into a plurality of end sections that meet at the axis of the tubular body in the contracted condition of the rivet, the inner surface of said inner end sections being conical and the outer surface being frustro-conical, flanges extending outwardly from the inner ends of the frustro-conical surface and at an angle of more than 90° to the frustro-conical surface, and a pin within the outer end of the bore of said hollow body for driving engagement with said inner conical surface to force said end sections outwardly to set the rivet.

3. A self-heading rivet as claimed in claim 2, wherein said flanges extend outwardly from the the inner ends of the frustro-conical surface of the hollow body at an angle in excess of 93° and not more than 115°.

4. A self-heading rivet as claimed in claim 2, wherein said flanges extend outwardly from the inner ends of the frustro-conical surface of the hollow body at an angle of between 100° and 115°.

5. A self-heading rivet as claimed in claim 2, wherein said flanges extend outwardly from the inner ends of the frustro-conical surface of the hollow body at an angle of the order of 110°.

6. A self-heading rivet comprising a headed tubular body having a shank initially of a substantially constant wall thickness, said shank being notched deeply with a plurality of V-shaped cuts that divide the inner end of the shank into a plurality of end sections, inclined flanges projecting outwardly from said end sections at an angle of between 93° and 115°, said end sections being bent inwardly to position said flanges within the diameter of the tubular body for insertion in a rivet hole, and a pin in the outer end of the bore of the tubular body for forcing said bent inner end sections outwardly to carry said inclined flanges beyond the circumferential surface of the tubular body.

7. A self-heading rivet as claimed in claim 6, wherein the shank of said tubular body has a radial thickness equal to one-half the diameter of the bore of the tubular body.

8. A self-heading rivet as claimed in claim 6, wherein the radial width of said flanges is equal to one-half the diameter of the bore of the tubular body.

9. A self-heading rivet as claimed in claim 6, wherein the radial thickness of the shank of said tubular body and the radial width of said flanges are each equal to one-half the diameter of the bore of said tubular body.

10. A self-heading rivet comprising a headed hollow body having a shank with a radial wall thickness of the order of one-half the maximum diameter of the bore of said hollow body, the inner end of the shank being longitudinally slotted for a length not less than said maximum bore diameter, flanges projecting outwardly from the end sections of the shank at an angle of the order of 110°, said end sections being bent inwardly towards the axis of said hollow body to position said flanges within the cylindrical surface of the outer diameter of said hollow body, and a pin within the bore of said hollow body for forcing said end sections outwardly.

11. A self-heading rivet as claimed in claim 10, wherein the axial length of said shank is not less than the diameter of said bore.

12. A self-heading rivet as claimed in claim 10, wherein the axial length of said shank is substantially greater than the diameter of said bore, and the axial length of said end sections is substantially less than that of said shank.

ARCHIBALD RANDAL MESSENGER.